3,391,994
METHOD FOR PRODUCING FAUJASITE-TYPE ZEOLITES

Walter L. Haden, Jr., Metuchen, and Frank J. Dzierzanowski, Somerset, N.J., assignors, by mesne assignments, to Engelhard Minerals & Chemicals Corporation, Menlo Park, N.J., a corporation of Delaware
No Drawing. Filed Dec. 8, 1964, Ser. No. 416,925
4 Claims. (Cl. 23—112)

ABSTRACT OF THE DISCLOSURE

Synthetic faujasite is prepared by reacting sodium hydroxide solution with kaolin clay that had been calcined under conditions such that the clay had undergone the characteristic kaolin exotherm after it was dehydrated. To produce a thermally stable form of zeolite Y having a high $SiO_2/Al_2O_3$ ratio, e.g., a mol ratio above 4, the reaction mixture is formulated to have a $Na_2O/SiO_2$ mol ratio within the range of 0.20 to 0.33.

---

This invention relates generally to the synthesis of zeolites of the molecular sieve type and is directed, specifically, to the production of synthetic crystalline zeolites that are similar to the mineral faujasite, namely, the molecular sieve type zeolites known as "zeolite X" and "zeolite Y."

Zeolite Y, which is a crystalline metalloaluminosilicate of the molecular sieve type, is described in U.S. 3,130,007 to Donald W. Breck. X-ray diffraction and gas absorption techniques are useful in distinguishing zeolite Y from other zeolites, including zeolite X, which is generally similar to zeolite Y and is described in U.S. 2,882,244 to Robert M. Milton.

As mentioned in U.S. 3,130,007, the chemical formula for sodium zeolite Y, expressed in terms of mols of oxides, can be written as follows:

$$0.9 \pm 0.2\ Na_2O:Al_2O_3:wSiO_2:xH_2O$$

wherein $w$ is a value greater than 3 and up to about 6, and $x$ may be a value up to about 9. The formula for sodium zeolite X is similar except that $w$ is lower and has a value of $2.5 \pm 0.5$. From the general formula, it can be seen that zeolite X and zeolite Y embrace crystalline sodium aluminosilicates of various silica-to-alumina ($SiO_2/Al_2O_3$) molar ratios. Examination of the properties of sodium zeolite Y of various silica-to-alumina ratios has shown that the increase of silica-to-alumina ratio affects important physical properties of the zeolite. Zeolite Y having a silica-to-alumina molar ratio in excess of about 4.5 is significantly more thermally stable than zeolite Y having a lower silica-to-alumina ratio, e.g., a ratio of 3.5. As a result, zeolite Y, especially high silica-to-alumina molar ratio sodium zeolite Y, is especially useful as an ingredient in producing catalysts or in certain selective absorption processes wherein the zeolite would be expected to encounter high temperature steam during use or regeneration. The noteworthy thermal stability of high silica-to-alumina ratio forms of zeolite Y also distinguishes such material from zeolite X or low silica-to-alumina forms of zeolite Y.

In producing zeolites X or Y, in accordance with the prior art, the sodium form of the zeolite is precipitated from dilute reactants and the reaction mass is filtered to separate the zeolite crystals from the mother liquor. The aqueous composition of the reaction mixtures has varied, depending upon the source of silica that has been used. Employing an aqueous colloidal silica sol or a reactive amorphous solid silica, it is reported that a high silica-to-alumina form of zeolite Y can be obtained with a reaction mixture having a composition that falls within the following range:

$Na_2O/SiO_2$ _____ 0.4 to 0.6
$SiO_2/Al_2O_3$ _____ 15 to 25
$H_2O/Na_2O$ _____ 20 to 50

Using sodium silicate, silica gels or silicic acid, the preferred reaction mixtures for precipitating zeolite Y are reported to fall within one of the following ranges:

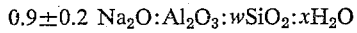

|  | Range 1 | Range 2 |
|---|---|---|
| $Na_2O/SiO_2$ | 0.70–0.90 | 1.5–1.7 |
| $SiO_2/Al_2O_3$ | 10–25 | 10–20 |
| $H_2O/Na_2O$ | 12–90 | 20–90 |

Compositions for precipitating sodium zeolite X in pure form are reported to fall within the following range:

$Na_2O/SiO_2$ _____ 1.2–1.5
$SiO_2/Al_2O$ _____ 3 to 5
$H_2O/Na_2O$ _____ 35 to 60

A comparison of the compositions of the prior art reaction mixtures with the compositions of zeolite X or zeolite Y shows that the reaction mixtures must have appreciably higher silica-to-alumina molar ratios than the zeolite products that are formed. This is especially true when producing high silica-to-alumina ratio forms of zeolite Y. Also, the sodium oxide-to-silica molar ratios are appreciably greater than the sodium oxide-to-silica ratios of the zeolite products. This indicates that only a small amount of the reactants are precipitated. Calculations of the quantity of reactants and reaction products in illustrative examples of U.S. 3,130,007 indicate very low yields of zeolite products are obtained. The low yields, taken with the high cost of the reactants, especially the high cost of the sources of silica and alumina, account for the high cost of sodium zeolite X or sodium zeolite Y obtained by the prior art precipitation process.

An object of this invention is the provision of a novel method for synthesizing zeolites similar to faujasite, namely, sodium zeolite X and sodium zeolite Y.

Another object of this invention is to synthesize zeolites similar to faujasite from comparatively inexpensive sources of sodium, silica and alumina.

Still another object is to synthesize faujasite in high yield.

A specific object is to produce high silica-to-alumina ratio sodium zeolite Y from a mineral source of silica and alumina.

Other objects and features of the invention will be apparent from the description thereof which follows:

We have discovered a method for producing zeolitic molecular sieves of the faujasite type from a mineral source of silica and alumina. Sodium zeolite X or Y can be produced, in accordance with our process, at a fraction of the cost of the zeolite produced in accordance with the prior art precipitation process. One reason is that our mineral source of silica and alumina is commercially available as a pigment material and is extremely inexpensive as compared to the sources of silica and alumina used in the prior art process. Another reason for the favorable economics of our process is that the yield of zeolite is greater than in the prior art process.

Stated briefly, in accordance with the present invention, the sodium form of zeolite X or zeolite Y is produced in the form of a solid or semisolid mass by hydrothermal treatment of an aqueous reaction mixture of a composition, expressed in terms of oxides, that falls within the following range:

$Na_2O/SiO_2$ _____ 0.2 to 1
$SiO_2/Al_2O_3$ _____ 2
$H_2O/Na_2O$ _____ 10 to 40

The specific zeolite that is produced, i.e., sodium zeolite X or sodium zeolite Y, and the silica-to-alumina molar ratio of that zeolite will vary with the composition of the reaction mixture, especially the sodium oxide-to-silica molar ratio of the reaction mixture. The use of high sodium oxide-to-silica ratios in the reaction mixture favors the formation of sodium zeolite X. The formation of zeolite Y is favored by the use of reaction mixtures having relatively low sodium oxide-to-silica ratios, especially sodium oxide-to-silica molar ratios less than about 0.5. To produce high silica-to-alumina sodium zeolite Y, in accordance with a preferred form of this invention, the composition of the reaction mixture falls within the following range:

| | |
|---|---|
| $Na_2O/SiO_2$ | 0.20 to 0.33 |
| $SiO_2/Al_2O_3$ | 2.0 |
| $H_2O/Na_2O$ | 20 to 30 |

An essential feature of our process is that substantially all of the silica and substantially all of the alumina in the reaction mixture is provided by a specific thermally processed clay material; namely, kaolin clay that has been calcined at a temperature and for a time such that the clay is dehydrated substantially completely and has undergone the characteristic kaolin exotherm at about 1800° F. after the dehydration has been effected. Another feature is that sodium hydroxide is used as the source of $Na_2O$ and is employed in the form of an aqueous solution of about 10% to about 35% weight concentration, which is the concentration required to provide the $Na_2O/H_2O$ molar ratio above set forth.

The crystallization of the reaction product is preferably effected by maintaining the reaction mixture at a temperature appreciably below the boiling point for a substantial period of time before heating the mixture under pressure sufficient to prevent dehydration. The reaction product is formed directly as a solid or semisolid mass that is usually dried, crushed and washed.

The products of this invention contain either sodium zeolite X or Y as the principal, usually the sole, crystalline phase (as determined by X-ray diffraction). These products, or ion-exchanged forms of the products, can be used in selective adsorption processes or, when mixed with suitable matrix material, they can be used as a component of a molecular sieve type cracking catalyst. The product can be subjected to ion-exchange treatment to substitute cations such as, for example, ammonium, or mixtures of ammonium and nonalkali cation, for sodium ions present in the product. Amorphous nonsieve material present in our reaction products does not interfere with the usefulness of the ion-exchanged form of our product as an ingredient of a cracking catalyst.

A comparison of our reactant masses with those of the prior art shows that the mixtures are fundamentally different in several respects. A principal difference is that the silica-to-alumina molar ratios in our aqueous reaction mixtures are appreciably lower than the silica-to-alumina ratios of zeolite X or zeolite Y. The prior art mixtures generally contain from two to ten times the silica-to-alumina molar ratios of our mixture. Another difference is that our reaction mixtures have a much lower sodium oxide-to-alumina ratio. Thus, our mixtures contain less than equimolal quantities of $Na_2O$ and $Al_2O_3$. In contrast, the prior art mixtures contain at least 2 mols $Na_2O$ per mole $Al_2O_3$ and, in some instances, they contain as much as 14 to 17 mols $Na_2O$ per mol $Al_2O_3$. A further and important difference is that our mixtures contain a much higher percentage of total solids ($Na_2O$, $Al_2O_3$ plus $SiO_2$) than the prior reaction mixtures. Thus, whereas the prior art mixtures are very dilute systems which must be filtered to recover the zeolite crystals, our reaction mixtures contain about 50% solids, on a weight basis, and the reactant product is formed directly as a solid or semisolid mass that requires mere drying and crushing and, optionally, a washing step to recover the zeolite product in the form of a finely divided mass.

The dehydrated kaolin clay employed in carrying out the invention is a substantially anhydrous aluminum silicate. The silicate is amorphous in the sense that it does not diffract X-radiation. The dehydrated clay material can be produced by calcining kaolin clay in air at product temperatures within the range of about 1600° F. to about 2000° F. for a sufficient time for the clay to undergo the exotherm after dehydration is completed. When calcination temperature is appreciably below 1700° F. or when insufficient time is allowed, some of the clay may not undergo the exotherm after dehydration. The presence of dehydrated kaolin clay which has not undergone the characteristic exotherm may lead to a product in which the silica-to-alumina ratio of the product is undesirably low. In fact, when a major quantity of dehydrated kaolin which has not undergone the exotherm is present in the aqueous reaction mixture, the desired zeolite will not be formed. Instead, different zeolites, especially zeolites having lower silica-to-alumina ratios are obtained. When calcination is at temperatures above 2000° F. for an appreciable time, the resulting material is not suitable for use in the preparation of the crystalline zeolite. Method and apparatus for detecting the presence of the strong characteristic exothermic reaction at about 1800° F. are described by Ralph E. Grim in "Clay Mineralogy," page 203, published by McGraw-Hill Book Company, Inc. (1953).

A method for calcining kaolin clay in a Nichols-Herreshoff furnace is described in U.S. 3,014,835 to William J. Proctor. To produce our calcined clay reactant in such furnace, the clay would be carried through heating zones No. 1 to No. 7, inclusive, of the furnace, as described in the patent.

Our dehydrated kaolin clay is preferably obtained from kaolin clay having a $SiO_2/Al_2O_3$ mol ratio as close to the theoretical value of 2.00 as is possible. However, the dehydrated clay may be obtained from kaolin clay having somewhat higher or lower $SiO_2/Al_2O_3$ mol ratios, e.g., 2.00±0.05. Kaolin clays are frequently associated with foreign materials such as quartz, and the removal of such materials from the kaolin assures formation of a zeolite of desired composition. This is especially true when such impurities are present in substantial amount. Hence, we prefer to use kaolin clay which has been treated for removal of grit and foreign bodies, as well as clots of undispersed kaolin clay. Our calcined clays should contain not more than about 1.0% of combined water (water of hydration). The starting dehydrated clay should be finely divided, i.e., all of the material should be minus 200 mesh (Tyler).

To provide suitable water-to-sodium oxide and sodium oxide-to-silica ratios in our reaction mixtures, we prefer to employ aqueous sodium hydroxide solutions of 10% to 20% weight concentration. At sodium hydroxide concentrations substantially below 10%, the product may fail to crystallize. At sodium hydroxide concentrations substantially above 20%, crystallization may also be inhibited.

In forming our reaction mixture, we thoroughly mix our calcined clay with a sodium hydroxide solution of suitable concentration. The consistency of the reaction mixture will vary for any given sodium oxide-to-silica ratio and the water-to-sodium oxide ratio. Typically, the mixture has the consistency of a thick slurry. The mixture can be placed in containers, such as pans, before reaction. As a result of reaction, the mixture hardens into a block which can be crushed and sized to provide granules of the desired size.

To convert the mixture of calcined clay with alkali solution into the desired crystalline sodium zeolite, the mixture is heated while it is out of direct contact with an external aqueous phase which would leach alkali from the mixture and while the mass is under sufficient vapor pressure to prevent dehydration. Thus, the vapor pressure exerted on the reactants must be equal to the vapor pressure of the reactants until molecular sieve formation is completed so as to prevent evaporation and to prevent condensation which would leach ingredients from the reaction mixture.

To obtain high yields of the zeolite, the reaction mixture should be maintained at a temperature well below the boiling point for several hours before the zeolite is subsequently crystallized at a temperature close to the boiling point and under pressure sufficient to prevent dehydration of the mass. It is recommended to maintain (age) the mass at a product temperature within the range of about 70° F. to about 130° F. for at least two hours, preferably for 24 to 72 hours, and then heat the mass to a product temperature ranging from about 150° F. to about 300° F. for at least 12 hours, preferably 24 to 72 hours, or until substantially no more zeolite can be crystallized from the mass. While good results can be realized with some reaction masses that have been heated to crystallization temperatures without an aging step, the product will generally be more crystalline when aging the mass at lower temperature before carrying out the high temperature crystallization.

To determine the minimum time required for the completion of the crystallization under the particular operating conditions employed, samples of the product may be taken after various intervals. Crystallization at elevated temperature should be prolonged until the product produces intense X-ray diffraction maxima characteristics of the desired zeolite.

The zeolite may be dehydrated substantially completely to form a molecular sieve by calcination at a temperature within the range of from about 220° F. to about 1200° F. or somewhat higher, and usually between about 400° F. to about 700° F. The calcination time will depend on calcination temperature and atmosphere. Partial dehydration may be suitable or desirable for some uses of the sieve.

To provide other forms of zeolite X or Y, the sodium zeolite may be base-exchanged with other monovalent cations, such as ammonium, hydrogen, potassium and lithium; group II metal ions such as magnesium, calcium and strontium; group III metal ions such as aluminum; and ions of transition metals such as nickel, titanium, chromium, iron, manganese, tungsten, as well as others whose atomic numbers are from 21 to 28, inclusive, 39 to 46, inclusive, and 72 to 78, inclusive. Other ions, such as cerium and copper, can be used. The base-exchange step can be effected by soaking, percolating or otherwise contacting the zeolite with a dilute aqueous solution of a soluble salt of the above-mentioned ions (or other exchangeable ions) until the desired degree of ion-exchange has taken place.

In the examples which follow, the calcined clay was an amorphous commercial pigment (Satintone #1), obtained by calcining Georgia kaolin clay at a temperature and for a time such that the characteristic exotherm had taken place after the clay was dehydrated. Following are typical specifications for Satintone #1.

Specific gravity _____ 2.6.
Moisture, max. _____ 1%.
Wet screen residue _____ 0.5% plus 325 mesh.
Average particle size, microns ____ 2.
pH _____ 5.8–6.3.

Chemical analysis (moisture-free wt. basis):

| | Percent |
|---|---|
| Ignition loss at 1800° F. | 0.5 |
| $SiO_2$ | 52.3 |
| $Al_2O_3$ | 44.6 |
| $Fe_2O_3$ | trace |
| $TiO_2$ | 2.0 |
| Alkali metal oxides | None |

All X-ray diffraction data referred to in these examples were obtained from random powder patterns using the K-alpha doublet of copper as the source of X-radiation, a receiving slit width of 0.006", a Norelco specimen holder having a sample area of 0.812"×0.408", a 3° take-off angle, a scintillation counter with pulse height analyzer, a scanning rate of 2° per minute, a time constant of 4 seconds, a scanning direction increasing from 2° to 90°, and a strip chart pen recorder. Specimens were equilibrated at 25° C. and 40% to 50% relative humidity for at least 18 hours prior to X-raying. Peak heights (counts per second, or c./s.) and positions were recorded on a strip chart.

In view of the similarity between the diffraction patterns of zeolites X and Y, each of which has a characteristic maximum at 6.2° $2\theta$, zeolite X was distinguished from zeolite Y by applying to X-ray powder diffraction patterns of products the criterion set forth in Table III of a publication by Donald C. Freeman, Jr., entitled "Electrical Conductivity of Synthetic Crystalline Zeolites," Journal of Chemical Physics, vol. 35, No. 3, September 1961. Table III in said publication correlates unit cell dimension with $SiO_2/Al_2O_3$ ratio. The silica-to-alumina molar ratio of zeolite Y products was determined from the unit cell dimensions derived from X-ray diffraction patterns.

In estimating percent crystalline zeolite of products, a commercial sample of high purity sodium zeolite was used as the reference. Percent sieve in samples was estimated by observing the intensity of ten characteristic peaks in c./s. and comparing the intensity of these peaks with the intensity of the corresponding peaks in the commercial sample.

Example I (a) A sample containing about 56% sodium zeolite Y with an approximate silica-to-alumina molar ratio of about 4.3, as determined by X-ray diffraction, was produced in accordance with our invention, as follows:

Fifteen and four-tenth pounds of Satintone #1 was mixed into 18.7 pounds of a 17.0% NaOH solution (containing 3.18 pounds NaOH) in a stainless steel reactor. The clay was added to the alkali solution over a period of 10 minutes with constant agitation during clay addition. The molar ratio of the oxides in the reaction mixture was as follows:

$Na_2O/SiO_2$ _____ 0.28
$SiO_2/Al_2O_3$ _____ 2.0
$H_2O/Na_2O$ _____ 23

The slurry was then stirred with a propeller type mixer for 4 hours during which time the temperature of the slurry gradually increased from 76° F. to 122° F.

A portion of the mixture was immediately transferred to a ½ gallon glass jar, with the slurry substantially filling the jar. The jar was sealed and placed in a 100° F. oven for 24 hours. While still sealed, the jar was placed in a 200° F. oven and maintained there for 48 hours. The jar and contents were permitted to cool to room temperature and the contents were crushed, then slurried in water and filtered on Buchner funnels to remove soluble components. The filter cakes were dried at 200° F. for 6 hours and then ground to minus 200 mesh in a high speed hammer mill (Mikro-Pulverizer).

(b) To determine whether the reaction mixture could be obtained by crystallizing at high temperature without a relatively low temperature aging treatment, part of the fresh slurry of Satintone #1 and 17% NaOH solution was placed in a pint jar which was sealed and immediately placed in the 200° F. oven and maintained there for 48 hours. The material was crushed, washed, and filtered. An X-ray diffraction pattern showed that about 47% zeolite Y having a $SiO_2/Al_2O_3$ molar ratio of about 4.6 was obtained. A comparison of this result with the result in part *a* of this example indicates that while a high silica-to-alumina form of zeolite Y could be obtained by heating the reaction mixture directly to crystallization temperature, the amount of crystallization that was obtained was somewhat less than when the mixture was aged at 100° F. before crystallization.

Example II

A sample containing about 30% crystalline zeolite Y with an approximate silica-to-alumina ratio of about 5.0, as determined by X-ray diffraction, was prepared by the procedure of Example I using 19.1 pounds of a 14.6% NaOH solution was 15.4 pounds of the Satintone #1. The composition of the reaction mixture was calculated to be as follows:

$Na_2O/SiO_2$ ---------------------------------- 0.25
$SiO_2/Al_2O_3$ --------------------------------- 2.0
$H_2O/Na_2O$ ---------------------------------- 27

Example III

Still in accordance with this invention, Satintone #1 was mixed with 12.2% NaOH solution for two hours, the mixture heated in a closed container at 100° F. for 24 hours and then at 240° F. for 72 hours. The composition of the reaction mixture, in terms of mol oxides, was as follows:

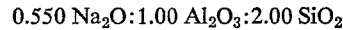
$0.550\ Na_2O : 1.00\ Al_2O_3 : 2.00\ SiO_2$

The product, after removal of a thin hard surface crust, was examined by X-ray diffraction was found to contain about 70% zeolite Y with as small amount of zeolite B as an impurity. The silica-to-alumina ratio of the zeolite Y was estimated by X-ray diffraction to be 4.4.

We claim:
1. A method for preparing a sodium aluminosilicate having a crystal structure similar to faujasite, which comprises:

forming an aqueous reaction mixture containing sodium hydroxide and an amorphous anhydrous aluminum silicate obtained by calcining kaolin clay at a temperature and for a time such that the characteristic kaolin exotherm has taken place after dehydration of the clay is completed, said sodium hydroxide and said amorphous anhydrous aluminum silicate being present in amount such that the aqueous reaction mixture has a composition, expressed in oxide mol ratios, within the following range:

$Na_2O/SiO_2$ ---------------------------- 0.2 to 1
$SiO_2/Al_2O_3$ --------------------------- 2
$H_2O/Na_2O$ ---------------------------- 10 to 40 and heating the reaction mixture under pressure sufficient to prevent dehydration until crystals of the desired zeolite are formed.

2. A method for producing sodium zeolite Y which comprises forming an aqueous reaction mixture containing sodium hydroxide and an amorphous anhydrous aluminum silicate obtained by calcining kaolin clay at a temperature and for a time such that the characteristic kaolin exotherm has taken place after dehydration of the clay is completed, said sodium hydroxide and said amorphous anhydrous aluminum silicate being present in amount such that the aqueous reaction mixture has a composition, expressed in oxide mol ratios, within the following range:

$Na_2O/SiO_2$ ---------------------------- 0.20 to 0.33
$SiO_2/Al_2O_3$ --------------------------- 2.0
$H_2O/Na_2O$ ---------------------------- 20 to 30 and heating the reaction mixture under pressure sufficient to prevent dehydration until crystals of sodium zeolite Y are formed.

3. A method for producing sodium zeolite Y which comprises forming an aqueous reaction mixture containing essentially oxides of sodium, aluminum and silicon in amounts such that the mixture has a composition, expressed in oxide mol ratios, within the following range:

$Na_2O/SiO_2$ ---------------------------- 0.20 to 0.33
$SiO_2/Al_2O_3$ --------------------------- 2.0
$H_2O/Na_2O$ ---------------------------- 20 to 30 substantially all of said oxides of aluminum and silicon being provided by inclusion in the reaction mixture of an amorphous material obtained by calcining kaolin clay at a temperature and for a time such that the characteristic kaolin exotherm has taken place after dehydration of the clay is completed, maintaining the reaction mixture at a temperature within the range of 70° F. to 130° F. for at least 12 hours and then heating the reaction mixture under pressure sufficient to prevent dehydration until the crystals of sodium zeolite Y are obtained in the form of a mass of solid consistency.

4. The method of claim 2 wherein said crystals of sodium zeolite Y have the X-ray diffraction of a form of said zeolite having a $SiO_2/Al_2O_3$ mol ratio above 4.

References Cited
UNITED STATES PATENTS 3,065,054  11/1962  Haden et al. ---------- 23—112
3,114,603  12/1963  Howell -------------- 23—113
3,119,659  1/1964  Taggart et al. -------- 23—112
3,119,660  1/1964  Howell et al. -------- 23—112

EDWARD J. MEROS, *Primary Examiner.*